Patented Aug. 24, 1937

2,090,947

UNITED STATES PATENT OFFICE 2,090,947

RECOVERY OF ACIDIC AND BASIC REAGENTS

Horace Finningley Oxley and Edward Boaden Thomas, Spondon, near Derby, England, assignors to Celanese Corporation of America, a corporation of Delaware No Drawing. Application September 24, 1935, Serial No. 41,868. In Great Britain October 2, 1934

17 Claims. (Cl. 260—122)

This invention relates to improvements in processes for the recovery of acidic and basic reagents, and particularly to processes for the recovery of volatile bases and acids from salts of such compounds.

Various industrial processes result in the formation of salts of volatile bases with volatile organic acids as by-products, and it is frequently desirable to treat these salts so as to separate and recover the constitutent bases and acids so that they may be employed again. One method of carrying out this operation is described in U. S. application S. No. 12,438, filed 22nd March 1935 according to which the salt is thermally decomposed and the acid and base separated by fractional distillation.

It has now been discovered that the recovery of volatile bases and volatile organic acids from their salts with one another may be greatly facilitated and the yield considerably improved by subjecting the salt of the volatile base and acid to distillation in the presence of a substance which is non-volatile under the conditions of the reaction, and which forms with the volatile organic acid a compound which is stable at the temperature necessary to dissociate the salt under treatment and distil off the volatile base, but from which the volatile acid can be subsequently recovered, e. g. by raising the temperature of distillation or by extraction with a suitable solvent. In this manner the tendency to form undesired products, e. g. acetamide in the decomposition of ammonium acetate, is reduced. Examples of suitable non-volatile substances are salts of the volatile organic acids with alkali metals, and particularly with potassium and sodium, e. g. potassium and sodium acetates. Preferably the acid radicle of the non-volatile substance employed is the same as that present in the salt to be treated.

The invention is of especial value in relation to the recovery of ammonia and acetic acid from solutions of ammonium acetate, and will therefore be described with particular reference thereto, but its application is not limited to this particular salt, but extends also to salts of other volatile bases, for example methylamines, ethylamines, and other aliphatic amines, with acetic acid, and of ammonia, methylamines, ethylamines, ethylene diamine and other volatile bases with propionic acid, butyric acid and other volatile fatty acids.

In carrying out the process of the present invention for the purpose of recovering ammonia and acetic acid from an aqueous solution of ammonium acetate, the solution is introduced into a distillation apparatus together with a suitable non-volatile acetate or other substance. For this purpose either sodium or potassium acetate may be employed, but it is found that mixtures of sodium and potassium acetates which fuse at a lower temperature than either of their constituents, and can therefore be more easily removed from the still if required, are particularly suitable. Inert substances which reduce the temperature of fusion of the non-volatile substance employed may be present with such substance. The amount of non-volatile acetate introduced may be of the order of one molecule for each molecule of ammonium acetate present, but preferably a somewhat higher proportion is employed, for example 1½ to 2 molecules or even more of non-volatile acetate to one molecule of ammonium acetate. After introduction of the non-volatile acetate, the aqueous solution may be fractionally distilled until the temperature of the liquid is of the order of 140° to 160° C. In this manner the major portion of the ammonia may be recovered. The residue in the still, which then comprises non-volatile acetate, acetic acid and some ammonium acetate, may then be fractionally distilled under vacuum, the temperature being allowed to rise gradually up to about 230° to 260° C. to decompose the acetic acid-fixed alkali acetate complex and distill off the acetic acid, which is obtained in the distillate together with some ammonium acetate. The acetic acid may be separated from the ammonium acetate by fractionation at atmospheric pressure, and the residue of this fraction together with a fresh charge of ammonium acetate solution may be introduced into the still containing the non-volatile acetate and the operation repeated. Any acetamide present in the residue from the acetic acid separation is hydrolyzed to ammonium acetate by the aqueous ammonium acetate solution during the first stage of the distillation process. In this manner a greatly improved recovery of the ammonia and acetic acid, as compared with that obtained by distillation in the absence of the fixed alkali salt, may be achieved.

Instead of recovering the acetic acid from the acid alkali acetate by thermal decomposition, the residue contained in the still after the ammonia has been distilled off may be extracted with a suitable solvent for acetic acid, the alkali acetate being then employed again and the acetic acid separated from the extraction medium by fractional distillation.

The recovery of the volatile acid and base according to the present invention may be carried out either as a continuous process or as a batch process, or a part of the process may be continuous and part discontinuous. Thus, ammonium acetate solution containing non-volatile acetate may be run into a distillation apparatus at a suitable point in the fractionating column so that as the liquid descends the column ammonia is driven off. The residue may be received in a still at the base of the column and may be withdrawn continuously or intermittently, and treated in another distillation apparatus where separation of the acetic acid is effected. The distillate from this apparatus may be collected in another distillation apparatus where the acetic acid is separated from the residue, which may contain ammonium acetate and acetamide. The residues from the second and third distillation apparatuses, which contain principally alkali acetate, ammonium acetate and acetamide may be mixed with fresh ammonium acetate solution and introduced again into the first distillation apparatus.

The process of the present invention may also be carried out by means of the method and/or apparatus described in U. S. application S. No. 695,967, filed 31st October 1933, to which reference is made in this connection.

The following example illustrates one method of carrying out the process of the present invention but it does not limit it in any way:—

*Example*

An aqueous solution of ammonium acetate to which an equimolecular mixture of sodium and potassium acetates has been added and which contains about 16% of ammonium acetate and 25% of alkali acetates is subjected to fractional distillation in a reflux apparatus having a reflux ratio of 4:1 (i. e. for each part of vapor that passes out of the condenser four parts are condensed and returned as reflux). As ammonia and water distil off, fresh liquor containing ammonium acetate and alkali acetates is fed into the still until the temperature in the still rises to about 150° C. The residue is then subjected to vacuum distillation until the temperature of the liquid rises to about 250° C. During this operation the alkali acetate-acetic acid compound is decomposed and practically all the acetic acid is distilled over together with some ammonium acetate. The residue consists chiefly of alkali acetate and contains only small proportions of ammonium acetate and free acetic acid. The distillate containing free acetic acid and some ammonium acetate is then fractionated at atmospheric pressure up to a temperature of about 215° C. in order to separate the acetic acid from the ammonium acetate. During this process the ammonium acetate present in the liquor being distilled is converted largely into acetamide. The residue from this distillation, consisting chiefly of acetamide, together with the residue from the vacuum distillation which consists chiefly of alkali acetate, is then mixed with a fresh quantity of ammonium acetate liquor and subjected to the same process, the acetamide being converted back again into ammonium acetate by the action of the ammonium acetate liquor.

Salts of volatile organic acids with volatile bases may also be separated into their constituents according to the present invention by forming a compound of the volatile base and distilling off the volatile acid from such compound.

The process of the present invention may also be employed in the concentration of solutions of volatile bases and volatile organic acids, particularly fatty acids such as acetic acid, by converting the base or acid into a salt with a volatile acid or base respectively, and then subjecting it to the process above described. Thus a dilute acid solution may be treated with ammonia or other volatile base to form the neutral salt and may then be treated according to the process of the present invention in the presence of a suitable non-volatile substance, e. g. sodium acetate, or the non-volatile substance may be formed in the solution by neutralizing it with a mixture in the required proportions of, for example, caustic soda and ammonia.

What we claim and desire to secure by Letters Patent is:—

1. Process for the separation of a salt of a volatile organic acid with a volatile base into its constituents, which comprises thermally decomposing the salt in the presence of a substance, which is non-volatile under the conditions of the reaction, which forms with the volatile acid a compound which is stable at the temperature employed to decompose the salt under treatment and which is capable of being readily decomposed by heat to liberate the volatile acid in the free state, and separating the volatile base from the compound of the acid with said substance.

2. Process for the separation of a salt of a volatile organic acid with a volatile base into its constituents, which comprises thermally decomposing the salt in the presence of a substance, which is non-volatile under the conditions of the reaction, which forms with the volatile acid a compound which is stable at the temperature employed to decompose the salt under treatment and which is capable of being readily decomposed by heat to liberate the volatile acid in the free state, distilling off the volatile base at a temperature below that at which any substantial decomposition of the said compound occurs, and then subjecting the residue to distillation to decompose the said compound and distil off the acid.

3. Process for the separation of a salt of a lower fatty acid with a volatile base into its constituents, which comprises thermally decomposing the salt in the presence of a substance which is non-volatile under the conditions of the reaction, which forms with the lower fatty acid a compound which is stable at the temperature employed to effect the decomposition and which is capable of being readily decomposed by heat to liberate the lower fatty acid in the free state, and separating the volatile base from the compound of the fatty acid with the said substance.

4. Process for the separation of a salt of acetic acid with a volatile base into its constituents, which comprises thermally decomposing the salt in the presence of a substance which is non-volatile under the conditions of the reaction, which forms with the acetic acid a compound which is stable at the temperature employed to effect the decomposition and which is capable of being readily decomposed by heat to liberate the acetic acid in the free state, distilling off the volatile base at a temperature below that at which any substantial decomposition of the said compound occurs, and then subjecting the residue to distillation to decompose the said compound and distil off acetic acid.

5. Process for the separation of a salt of a volatile organic acid with ammonia into its constituents, which comprises thermally decomposing the salt in the presence of a substance which is non-volatile under the conditions of the reaction, which forms with the volatile organic acid a compound which is stable at the temperature employed to effect the decomposition and which is capable of being readily decomposed by heat to liberate the volatile acid in the free state, and separating ammonia from the compound of the acid with the said substance.

6. Process for the separation of the salt of acetic acid with ammonia into its constituents, which comprises thermally decomposing the salt in the presence of a substance which is non-volatile under the conditions of the reaction, which forms with the acetic acid a compound which is stable at the temperature employed to effect the decomposition and which is capable of being readily decomposed by heat to liberate the acetic acid in the free state, distilling off the ammonia at a temperature below that at which any substantial decomposition of the said compound occurs, and then subjecting the residue to distillation to decompose the said compound and distill off acetic acid.

7. Process for the separation of a salt of a lower fatty acid with a lower alkylamine into its constituents, which comprises thermally decomposing the salt in the presence of a substance which is non-volatile under the conditions of the reaction, which forms with the lower fatty acid a compound which is stable at the temperature employed to effect the decomposition and which is capable of being readily decomposed by heat to liberate the lower fatty acid in the free state, and separating the lower alkylamine from the compound of the acid with the said substance.

8. Process for the separation of a salt of a volatile organic acid with a volatile base into its constituents, which comprises thermally decomposing the salt in the presence of an alkali metal salt of the said volatile organic acid which is non-volatile under the conditions of the reaction and which forms with the volatile organic acid a compound which is stable at the temperature employed to effect the decomposition, and separating the volatile base from the compound of the acid with the said alkali metal salt.

9. Process for the separation of the salt of ammonia with acetic acid into its constituents, which comprises thermally decomposing the salt in the presence of an alkali metal acetate so as to form an acid alkali metal acetate, and separating the ammonia from the said acid alkali metal acetate.

10. Process for the separation of the salt of ammonia with acetic acid into its constituents, which comprises thermally decomposing the salt in the presence of a mixture of sodium and potassium acetates so as to form mixed acid sodium acetate and acid potassium acetate, and separating ammonia from the said mixed acid acetates.

11. Process for the separation of a salt of a lower alkylamine with acetic acid into its constituents, which comprises thermally decomposing the salt in the presence of a mixture of sodium acetate and potassium acetate so as to form a mixture of acid sodium acetate and acid potassium acetate, and separating the lower alkylamine from the said mixed acid acetates.

12. Process for the separation of the salt of ammonia with acetic acid into its constituents, which comprises thermally decomposing the salt in the presence of a mixture of sodium and potassium acetates so as to form a mixture of acid sodium acetate and acid potassium acetate, distilling off the ammonia at a temperature below that at which any substantial decomposition of the mixed acid acetates occurs, and then subjecting the mixed acid acetates to vacuum distillation to decompose them and distil off the acetic acid.

13. Process for the separation of a salt of a methylamine with acetic acid into its constituents, which comprises thermally decomposing the salt in the presence of a mixture of sodium acetate and potassium acetate so as to form a mixture of acid sodium acetate and acid potassium acetate, distilling off the methylamine at a temperature below that at which any substantial decomposition of the mixed acid acetates occurs, and then subjecting the mixed acid acetates to vacuum distillation to decompose them and distil off the acetic acid.

14. Process for the separation of a salt of a volatile organic acid with a more volatile lower alkylamine into its constituents, which comprises thermally decomposing the salt in the presence of a substance which is non-volatile under the conditions of the reaction, which forms with the volatile acid a compound which is stable at the temperature employed to effect the decomposition and which is capable of being readily decomposed by heat to liberate the volatile acid in the free state, and separating the lower alkylamine from the compound of the acid with the said substance.

15. Process for the separation of a salt of acetic acid with a more volatile lower alkylamine into its constituents, which comprises thermally decomposing the salt in the presence of an alkali metal acetate so as to form an acid alkali metal acetate, and separating the lower alkylamine from the said acid alkali metal acetate.

16. Process for the separation of the salt of ammonia with acetic acid into its constituents, which comprises thermally decomposing the salt in the presence of a mixture of sodium acetate and potassium acetate so as to form a mixture of acid sodium acetate and acid potassium acetate, distilling off the ammonia at a temperature below that at which any substantial decomposition of the mixed acid acetate occurs, subjecting the mixed acid acetates to vacuum distillation to decompose them and distil off crude acetic acid, and subjecting the crude acetic acid to fractional distillation in order to separate pure acetic acid from other constituents present therein.

17. Process for the separation of the salt of ammonia with acetic acid into its constituents, which comprises thermally decomposing the salt in the presence of a mixture of sodium acetate and potassium acetate so as to form a mixture of acid sodium acetate and acid potassium acetate, distilling off the ammonia at a temperature below that at which any substantial decomposition of the mixed acid acetates occurs, subjecting the mixed acid acetates to vacuum distillation to decompose them and distil off crude acetic acid, subjecting the crude acetic acid to fractional distillation in order to separate pure acetic acid from other constituents present therein, and mixing the residues from the vacuum distillation and from the fractional distillation with fresh liquor containing the salt of ammonia with acetic acid, and subjecting that mixture to the said separation process.

HORACE FINNINGLEY OXLEY.
EDWARD BOADEN THOMAS.